United States Patent
Flesher

(12) 
(10) Patent No.: US 6,772,892 B2
(45) Date of Patent: Aug. 10, 2004

(54) REUSABLE CLOSURE SYSTEM FOR BOTTLE-TYPE CONTAINERS

(75) Inventor: Hal Stephen Flesher, Turlock, CA (US)

(73) Assignee: E. & J. Gallo Winery, Modesto, CA (US)

( * ) Notice: Subject to any disclaimer, the term of this patent is extended or adjusted under 35 U.S.C. 154(b) by 0 days.

(21) Appl. No.: 10/299,926

(22) Filed: Nov. 19, 2002

(65) Prior Publication Data

US 2004/0094500 A1 May 20, 2004

(51) Int. Cl.⁷ ................................................ B65D 39/00
(52) U.S. Cl. ....................... 215/249; 215/274; 215/352
(58) Field of Search ............................... 215/228, 249, 215/247, 263, 264, 250, 251, 286, 213, 273, 294–300, 255, 256, 257, 288, 352, 54, 274; 220/801, 803, 804

(56) References Cited

U.S. PATENT DOCUMENTS

| | | | | | |
|---|---|---|---|---|---|
| 2,531,570 A | * | 11/1950 | Hoffman | ................... | 215/11.1 |
| 3,547,297 A | * | 12/1970 | Herbert | .................... | 215/249 |
| 3,920,141 A | * | 11/1975 | Bojardi | ..................... | 215/251 |
| 4,177,905 A | * | 12/1979 | Winchell et al. | ............ | 215/246 |
| 4,482,071 A | * | 11/1984 | Ishiwatari | .................. | 215/255 |
| 5,080,245 A | * | 1/1992 | Conard | ....................... | 215/249 |
| 5,172,821 A | * | 12/1992 | Knopf | ......................... | 215/286 |
| 5,230,429 A | * | 7/1993 | Etheredge, III | ......... | 206/459.1 |
| 5,662,231 A | * | 9/1997 | Adams et al. | ............. | 215/254 |
| 6,024,235 A | * | 2/2000 | Schwab | ...................... | 215/247 |
| 6,241,112 B1 | * | 6/2001 | Claessens et al. | ......... | 215/247 |

* cited by examiner

Primary Examiner—Lien Ngo
(74) Attorney, Agent, or Firm—Marshall, Gerstein & Borun LLP

(57) ABSTRACT

A reusable closure system for containers, such as wine bottles. The closure system is designed for containers or bottles having a finish ring disposed on an outer surface of the neck of the container. The system includes a disk connected to a plug. The disk includes a first flat surface and a second opposing surface. The plug extends outward from the second surface. In the initial sealed and packaged condition, the flat surface of the disk overlies the rim of the container and a removable compression ring securely holds the disk in place over the rim of the container. The removable compression ring includes a cylindrical body with an upper end connected to a radially inwardly extending upper lip which engages the second surface of the cap and through which the plug extends. The compression ring also includes a radially inwardly extending lower lip which engages the finish ring of the container. The compression ring preferably includes a pull tab and perforations for easy removal. The flat surface of the disk may be equipped with a gasket and oxygen barrier layer.

29 Claims, 2 Drawing Sheets ic Field

Improved reusable closure systems for bottle-type containers are disclosed. By way of an example, an improved reusable closure system for bottles, such as wine bottles, is disclosed. Methods for manufacturing reusable closure systems are also disclosed.

2. Background of the Related Art

Numerous techniques have been used to seal bottles of wine and other beverages. The traditional method involves the use of natural cork that is processed from the bark of cork oak trees. However, there are several negative aspects which are inherent in the use of natural cork as a closure system.

For example, cork is capable of adversely affecting the taste of the bottled wine because of a chemical compound found naturally in cork, 2, 4, 6-trichloranisole or TCA. TCA affects the odor and flavor of the wine and can account for a substantial percentage of spoilage of all wine bottled with natural corks.

Another problem associated with natural cork is consistency and quality. Specifically, natural cork is susceptible to insect damage, cracks and other naturally occurring defects which can allow oxygen to leak into the bottle or allow the wine to leak from the bottle. Again, these naturally occurring defects in natural cork also account for a substantial percentage of spoilage of bottled wine.

Cork is also a limited natural resource. Natural cork bark is harvested from cork oak trees which are only able to replenish themselves on the order of once every ten years. The slow growth of natural cork bark in combination with the fact that a newly planted cork oak tree requires 30 years to mature, leaves the natural cork industry with a limited ability to increase productivity to meet the demand of the wine industry. As a result, cork is relatively expensive.

Further, consumers are often frustrated by wine corks as they require a special tool in the form of a cork screw to remove the cork from the bottle and inexperienced users often break off pieces of the cork where they are later found floating in the wine bottle or in a wine glass. Finally, corks are only effective in resealing the wine bottle to a limited extent as they can often break upon subsequent removals.

As an alternative to natural corks, synthetic corks have been developed which are typically molded or extruded polymers. However, synthetic or plastic corks have not been accepted by many wine makers because extended shelf-life studies have shown the plastic corks tend to strip flavors from the wine product. Further, many synthetic corks also require the use of a cork screw and can be difficult for some consumers to remove. Synthetic corks also tend to be difficult to reinsert into the bottle for resealing, thereby frustrating the consumer.

Bulb-top corks have been developed to be removed and re-inserted from wine bottles without a special tool, such as cork screw. However, bulb-top corks can develop problems in storage, shipping and distribution due to the reduced interference between the cork and the bottle neck inside diameter. As the product warms and internal pressure within the bottle increases, the stoppers can be pushed from the bottle. As the product cools, air can leak back into the head space causing the wine product to oxidize.

Aluminum caps have not found wide acceptance in the wine industry or with wine consumers. Aluminum caps, which are applied using a roll-on technique, can also encounter problems in storage and transportation. Specifically, as the capped bottles are stacked and subsequently unstacked, a load is applied and then removed from the cap and liner. It has been found that the cap liner takes time to recover and the seal between the liner and the glass rim can be lost. As a result, the cap becomes loose, oxygen leaks into the bottle thereby causing oxidization of the wine. It has also been found that roll-on aluminum caps can loosen during shipment and handling.

As a result, there is a need for an improved closure system for wine and other delicate liquids that solve some or all of the problems discussed above.

SUMMARY OF THE DISCLOSURE

In satisfaction of the aforenoted needs, an improved reusable closure system for containers is provided which is applicable to wine bottles and other containers as well. The reusable closure system is designed for a container having a neck with a rim defining a bore. The container also has a finish ring disposed on an outer surface of the neck and below the rim. The closure system comprises a compression disk connected to a plug. The compression disk comprises a first surface and a second surface. The compression disk and plug are coaxial with the plug extending outward from the second surface of the compression disk. The system further comprises a removable compression ring that comprises a generally cylindrical body comprising an upper end connected to a radially inwardly extending upper lip and a lower end connected to a radially inwardly extending lower lip. In an initially sealed and packaged condition, the first surface of the compression disk overlies the rim of the container, the upper lip of the compression ring engages the second surface of the compression disk and the lower lip of the compression ring engages the finish ring disposed on the neck of the container thereby pressing the first surface of the compression disk towards the rim of the container. To open the closure system, the removable compression ring is removed and, to reseal the container, the plug is inverted and inserted through the opening of the container to frictionally engage the bore and seal the container.

In an embodiment, in the initially sealed and packaged condition, the plug extends through an opening defined by the upper lip of the compression ring.

In an embodiment, the removable compression ring further comprises at least one perforation extending from the upper lip to the lower lip. In a preferred embodiment, the removable compression ring further comprises two spaced apart perforations extending from the upper lip to the lower lip with a pull tab disposed therebetween for easy removal of the compression ring.

In an embodiment, the closure system further comprises a gasket disposed between the first surface of the disk and the rim of the container in the initially sealed and packaged condition.

In an embodiment, the closure system further comprises an oxygen barrier layer that overlies the rim of the container and which is sandwiched between the first surface of the disk and the rim of the container in the initially sealed and packaged condition. Preferably, the oxygen barrier layer is fabricated from aluminum.

In an embodiment, the closure system comprises both an oxygen barrier layer and a gasket. The oxygen barrier layer may be attached to the first surface of the disk and the gasket may be attached to the oxygen barrier layer so that the oxygen barrier layer is sandwiched between the first surface of the disk and the gasket when the container is initially sealed. The gasket then would engage the rim of the container in the initially sealed and packaged condition.

The cap may be fabricated from an injection molded foam polymer. The cap may further comprise oxygen scavenging materials. The compression ring may be fabricated from aluminum or other like materials.

The closure system may be fabricated by rolling the compression ring around the compression disk. Preferably, the compression ring includes an upper lip that surrounds the plug but allows the plug to extend through an opening defined by an upper lip of the compression ring. If an oxygen barrier layer and gasket are provided, these two elements may be pre-attached to the first surface of the compression disk prior to application of the compression ring thereto. Then, with the first surface of the compression disk or with the gasket facing downward, the entire structure is pressed downward over the rim and finish ring of a bottle. To secure the compression ring around the finish ring of the bottle, a modified pressure block is utilized.

As noted above, the closure system is particularly suitable for bottles of wine, but will also be applicable to other liquid containing containers as well.

BRIEF DESCRIPTION OF THE DRAWINGS

The disclosed closing systems in containers are described more or less diagrammatically in the accompanying drawings wherein.

The drawings are not necessarily to scale and the embodiments are sometimes illustrated by diagrammatic representations and fragmentary views. In certain instances, details which are not necessary for an understanding of the disclosed closure system or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
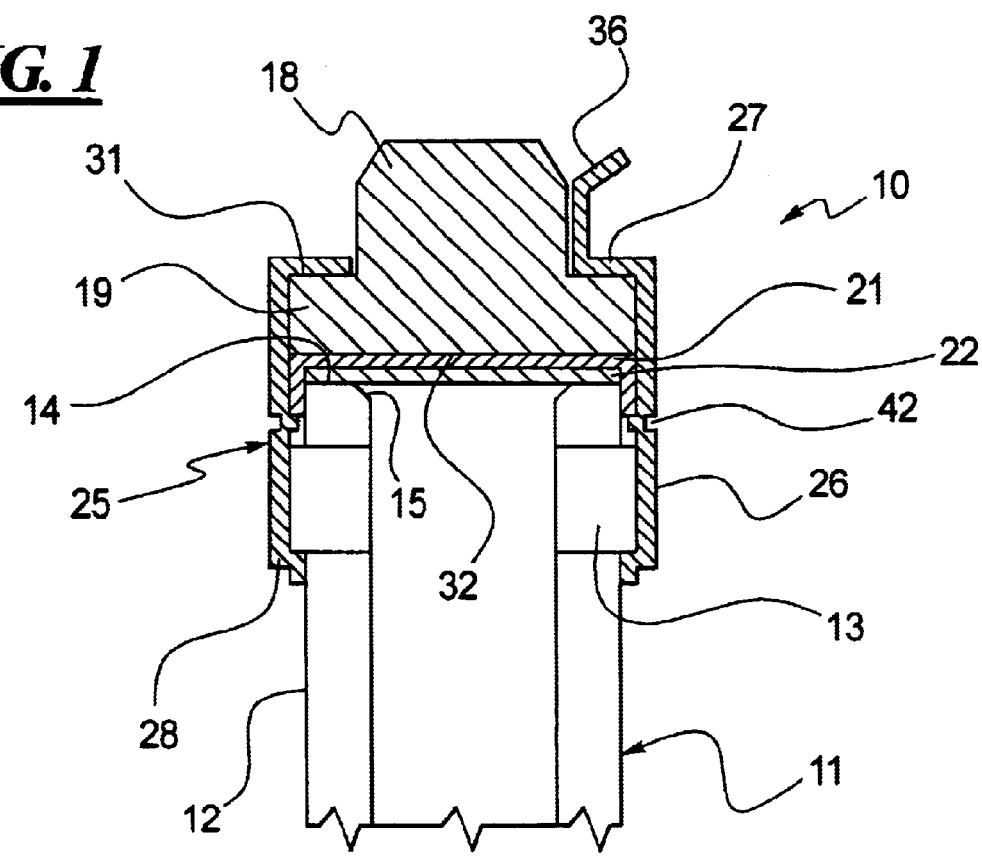
FIG. 1 is a sectional view illustrating a disclosed closure system as initially attached to a bottle or container.

FIG. 1 illustrates a closure system 10 as mounted to a container, such as a bottle 11. The closure system 10 is designed for a container 11 having a neck 12 and a finish ring 13. The neck 12 includes an upper rim 14 which defines an opening 15.

The closure system 10 includes a plug 18 and a compression disk 19. In the initially sealed and packaged condition illustrated in FIG. 1, the compression disk 19 presses an oxygen barrier layer 21 and a sealing gasket 22 against the upper rim 14 of the container 11. Downward pressure on the compression disk 19 is provided by the compression ring 25 which includes a generally cylindrical body 26 connected at an upper end to a radially inwardly extending upper lip 27 and, at a bottom end, to a radially inwardly extending lower lip 28.

The compression ring 25 is applied with a roll-on capping machine having a modified pressure block that compresses the upper rim 27, and therefore the shoulder 31 of the disk 19 downward towards the upper rim 14 of the container 11 thereby sandwiching the oxygen barrier layer 21 and gasket 22 between the upper rim 14 and the flat side 32 of the disk 19.

Figure 3:
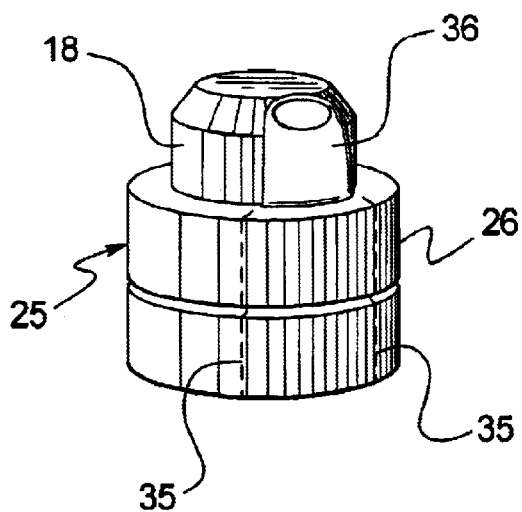
FIG. 3 is a perspective view of the closure system shown in FIG. 1.
Figure 4:
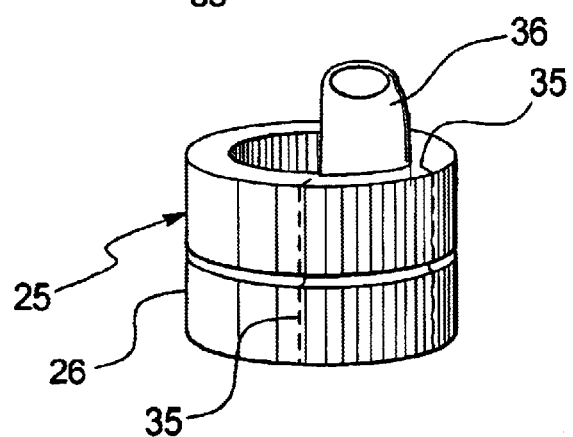
FIG. 4 is a perspective view of the compression ring of the closure system shown in FIG. 1.
Figure 5:
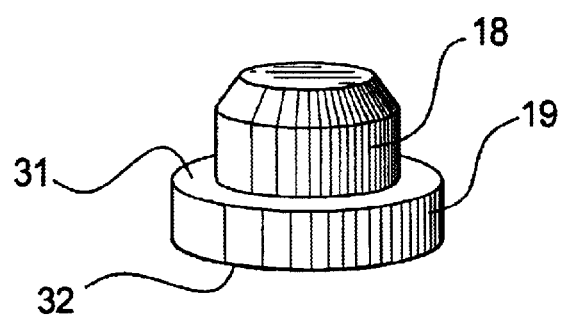
FIG. 5 is a perspective of the cap of the closure system shown in FIG. 1.

As shown in FIGS. 1 and 3, the compression ring 25 may also include one or more perforations 35 and a pull tab 36 for easy removal of the sealing ring 25 from the container 11.

Figure 2:
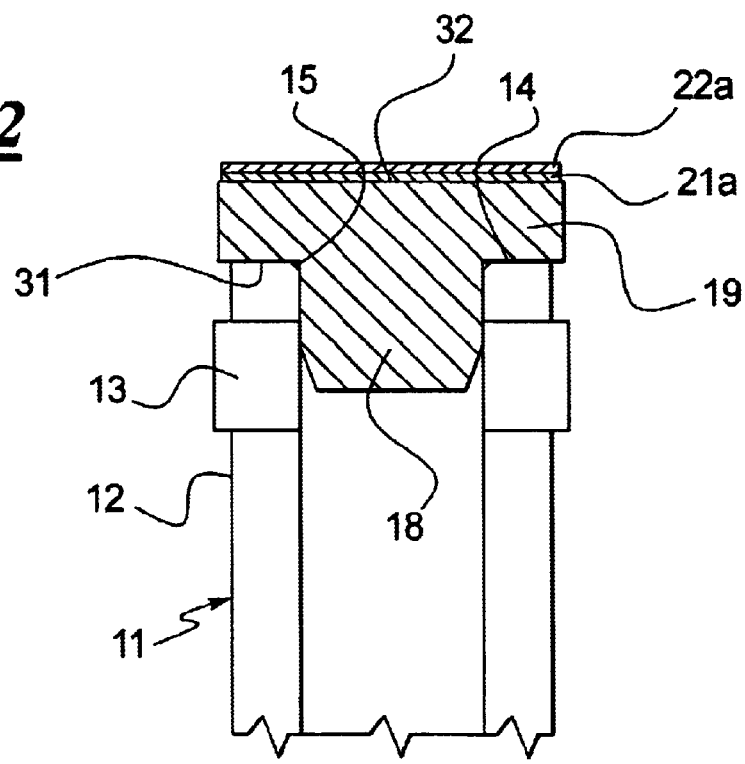
FIG. 2 is a sectional view illustrating the cap of the closure system shown in FIG. 1 in a resealed position and further illustrating alternative embodiments of the gasket and oxygen barrier layer.

Turning to FIG. 2, after removal of the compression ring 25, and the gasket 22 and oxygen barrier layer 21, the plug 18 may then be inverted so that it extends through the opening 15 of the container 11 and further so that the shoulder 31 or second side 31 of the disk 19 engages the rim 14 of the container with the first side or flat side 32 of the disk 19 facing upward. The plug 18 should be designed so as to tightly frictionally engage the bore 15 of the container 11.

Also shown in FIG. 2 is an alternative embodiment of the oxygen barrier layer 21a and gasket 22a. As shown in FIG. 2, the layers 21a, 22a may be pre-attached to the first surface 32 of the compression disk 19.

Figure 6:
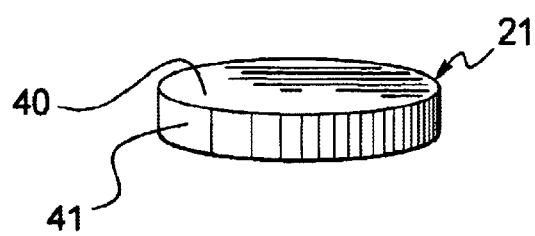
FIG. 6 is a perspective view of the oxygen barrier layer of the closure system shown in FIG. 1.
Figure 7:
FIG. 7 is a perspective view of the gasket of the closure system of FIG. 1.

Turning to FIGS. 1 and 6–7, the oxygen barrier layer 21 may also be provided in the shape of a cap having a flat disk 40 and downwardly extending wall 41 in which the gasket 22 may be inserted into prior to installation on the rim 14 of the container 11. The oxygen barrier cap 21 with the gasket 22 inserted therein can then be fitted over the rim 14 of the container 11 as shown in FIG. 1. If this technique is employed, an additional middle ring 42 may be rolled into the cylindrical body 26 of the compression ring 25 so as to securely hold the oxygen barrier cap 21 and gasket 22 in place.

Suitable materials for the gasket 22 include, but are not limited to plastisol, polyethylene, ethylenevinylacetate (EVA) and polyvinylchloride.

The oxygen barrier layer 21a or cap 21 are preferably fabricated from aluminum because of its low cost and excellent impermeability. Other materials such as polymers or plastics may be used.

The plug 18/compression disk 19 structure is preferably fabricated from a foam polymer material, preferably a closed-cell foam polymer material. Suitable polymers include, but are not limited to EVA and polypropylene. The plug 18 and compression disk 19 are preferably molded as a single structure but may also be molded separately.

Further, in order to reduce the possibility of oxidation of the wine when the plug 18/compression disk 19 structure is in the resealed position shown in FIG. 2, an oxygen scavenger may be incorporated into the polymer of the plug 18/compression disk 19 structure. Oxygen scavengers have been found to extend and preserve the freshness and shelf-life of the bottled product. Oxygen scavenger concentrates such as sodium acorbate, sodium sulfite, edetate dipotassium (dipotassium EDTA), hydroquinone and other similar substances that are used to actively bind free oxygen can be incorporated into the polymer foam of the plug 18/compression disk 19 structure. Typically, such oxygen scavengers remain dormant throughout the bottling and packaging process and are activated by the presence of moisture. Thus, any oxygen scavenging materials contained within the plug 18/compression disk 19 structure will be activated when the plug 18 is moved to the resealed position shown in FIG. 2.

The compression ring 25 is preferably fabricated from aluminum.

While only certain embodiments have been set forth, alternative embodiments and various modifications will be apparent from the above description to those skilled in the art. These and other alternatives are considered equivalents and within the spirit and scope of this disclosure.

What is claimed is:

1. A reusable closure system for a container having a neck with a rim defining a bore, the container also having a finish ring disposed on an outer surface of the neck and below the rim, the closure system comprising:
    a disk connected to a plug, the disk comprising a first surface and a second surface, the disk and plug being coaxial with the plug extending outward from the second surface of the disk,
    a removable compression ring comprising a generally cylindrical body comprising an upper end connected to a radially inwardly extending upper lip and a lower end connected to a radially inwardly extending lower lip,
    in an initially sealed and packaged condition, the first surface of the disk overlying the rim of the container, the upper lip of the compression ring engaging the second surface of the compression disk, the lower lip of the compression ring engaging the finish ring,
    and, in a resealed condition, the plug frictionally engaging the bore when inserted into the opening defined thereby.

2. The closure system of claim 1 wherein in the initially sealed and packaged condition, the plug extends through an opening defined by the upper lip of the compression ring.

3. The closure system of claim 1 wherein the removable compression ring further comprises at least one perforation extending from the upper lip to the lower lip.

4. The closure system of claim 1 wherein the removable compression ring further comprises two spaced apart perforations extending from the upper lip to the lower lip with a pull tab disposed therebetween.

5. The closure system of claim 1 further comprising a gasket disposed between the first surface of the disk and the rim of the container in the initially sealed and packaged condition.

6. The closure system of claim 1 further comprising an oxygen barrier layer that overlies the rim of the container which is sandwiched between the first surface of the disk and the rim of the container in the initially sealed and packaged condition.

7. The closure system of claim 6 wherein the oxygen barrier layer comprises aluminum.

8. The closure system of claim 6 wherein the oxygen barrier layer further comprises a downward extending wall that surrounds and mateably receives the rim of the container in the initially sealed and packaged condition.

9. The closure system of claim 8 wherein the wall of the oxygen barrier layer terminates at a lower edge and the body of the compression ring comprises a radially inwardly extending middle ring disposed between the upper and lower ends thereof and that engages the lower edge of the wall of the oxygen barrier layer in the initially sealed and packaged condition.

10. The closure system of claim 1 wherein the first surface of the disk is attached to an oxygen barrier which, in turn, is attached to a gasket that engages the rim of the container so that the oxygen barrier layer is sandwiched between the first surface of the disk and the gasket in the initially sealed and packaged condition.

11. The closure system of claim 1 wherein the compression disk and plug are fabricated from an injection molded foam polymer.

12. The closure system of claim 11 wherein the plug further comprises oxygen scavenging materials.

13. The closure system of claim 1 wherein the compression ring comprises aluminum.

14. A reusable closure system for a container having a neck with an upper rim defining a bore, the container also having a finish ring disposed on an outer surface of the neck and below the upper rim, the closure system comprising:
    a compression disk connected to a plug, the compression disk comprising a first surface and a second opposing surface, the compression disk and plug being coaxial with the plug extending outward from the second surface of the compression disk,
    a gasket,
    an impermeable oxygen barrier layer,
    a removable compression ring comprising a generally cylindrical body comprising an upper end connected to a radially inwardly extending upper lip and a lower end connected to a radially inwardly extending lower lip,
    in an initially sealed and packaged condition, the gasket engaging the upper rim with the oxygen barrier layer overlying the gasket and the first surface of the compression disk overlying the oxygen barrier layer, the upper lip of the compression ring engaging the second surface of the compression disk, the lower lip of the compression ring engaging the finish ring to compress the upper rim, gasket, oxygen barrier layer and first surface of the compression disk together,
    and, in a resealed condition, the plug frictionally engaging the upper rim when inserted into the opening defined thereby.

15. The closure system of claim 14 wherein in the initially sealed and packaged condition, the plug extends through an opening defined by the upper lip of the compression ring.

16. The closure system of claim 14 wherein the removable compression ring further comprises at least one perforation extending from the upper lip to the lower lip.

17. The closure system of claim 14 wherein the removable compression ring further comprises two spaced apart perforations extending from the upper lip to the lower lip with a pull tab disposed therebetween.

18. The closure system of claim 14 wherein the oxygen barrier layer comprises aluminum.

19. The closure system of claim 14 wherein the oxygen barrier layer is attached to the first side of the compression disk and the gasket is attached to the oxygen barrier layer with the oxygen barrier layer sandwiched between the first side of the compression disk and the gasket.

20. The closure system of claim 14 wherein the compression disk and plug are fabricated from an injection molded foam polymer.

21. The closure system of claim 20 wherein the plug further comprises oxygen scavenging materials.

22. The closure system of claim 14 wherein the compression ring comprises aluminum.

23. A method for sealing a bottle a neck with an upper rim defining a bore, the bottle also having a finish ring disposed on an outer surface of the neck and below the upper rim, the method comprising:

providing a disk connected to a plug, the disk comprising a first surface and a second opposing surface, the disk and plug being coaxial with the plug extending outward from the second surface of the disk, inserting the plug and disk through a lower end of a compression ring comprising a generally cylindrical body comprising an upper end connected to a radially inwardly extending upper lip and the lower end connected to a radially inwardly extending lower lip, the upper lip of the compression ring engaging the second surface of the disk, mounting the lower end of the compression ring over the upper rim and finish ring of the bottle, applying downward pressure on the upper ring of the compression ring and upward pressure on the lower ring of the compression ring to press the first surface of the disk and rim of the bottle towards each other.

24. The method of claim 23 wherein a gasket is attached to the first surface of the disk so that the gasket engages the rim of the bottle.

25. The method of claim 23 wherein an oxygen barrier layer is attached to the first surface of the disk and a gasket is attached to the oxygen barrier layer so that the oxygen barrier layer is sandwiched between the gasket and the first surface of the disk and the gasket engages the rim of the bottle.

26. A method of resealing a container, the method comprising:

providing a container and closure system, the container comprising a neck with a rim defining a bore, the container also comprising a finish ring disposed on an outer surface of the neck and below the rim, and the closure system comprising a disk connected to a plug, the disk comprising a first surface and a second surface, the disk and plug being coaxial with the plug extending outward from the second surface of the disk, the closure system further comprising a removable compression ring comprising a generally cylindrical body comprising an upper end connected to a radially inwardly extending upper lip and a lower end connected to a radially inwardly extending lower lip, wherein in an initially sealed and packaged condition, the first surface of the disk overlying the rim of the container, the upper lip of the compression ring engaging the second surface of the compression disk, the lower lip of the compression ring engaging the finish ring, wherein in a resealed condition, the plug frictionally engaging the bore when inserted into the opening defined thereby;

removing the compression ring;

lifting first surface of the disk away from the upper rim of the container; and inserting the plug through the rim of the container.

27. A method of reducing oxidation of an opened container of wine, the method comprising:

providing a container and closure system, wherein the container contains wine and wherein the container comprising a neck with a rim defining a bore, the container also comprising a finish ring disposed on an outer surface of the neck and below the rim, the closure system comprising a disk connected to a plug, the disk comprising a first surface and a second surface, the disk and plug being coaxial with the plug extending outward from the second surface of the disk, the closure system further comprising a removable compression ring comprising a generally cylindrical body comprising an upper end connected to a radially inwardly extending upper lip and a lower end connected to a radially inwardly extending lower lip, wherein in an initially sealed and packaged condition, the first surface of the disk overlying the rim of the container, the upper lip of the compression ring engaging the second surface of the compression disk, the lower lip of the compression ring engaging the finish ring, and wherein in a resealed condition, the Plug frictionally engaging the bore when inserted into the opening defined thereby, and, wherein the compression disk and plug are fabricated from an injection molded foam polymer;

removing the compression ring;

lifting the first surface of the disk away from the upper rim of the container;

inserting the plug through the rim and into the bore of the container; and allowing wine to engage the plug while the plug is disposed in the bore of the container.

28. A bottle comprising:

a bottle comprising a neck with an upper rim defining a bore, the neck comprising a finish ring on an outer surface thereof and disposed below the upper rim, a disk connected to a plug, the disk comprising a first surface and a second surface, the disk and plug being coaxial with the plug extending outward from the second surface of the disk, a removable compression ring comprising a generally cylindrical body comprising an upper end connected to a radially inwardly extending upper lip and a lower end connected to a radially inwardly extending lower lip, in an initially sealed and packaged condition, the first surface of the disk overlying the upper rim of the bottle, the upper lip of the compression ring engaging the second surface of the disk, the lower lip of the compression ring engaging the finish ring, and, in a resealed condition, the plug frictionally engaging the bore when inserted into the opening defined thereby.

29. The bottle of claim 28 wherein the first surface of the disk is attached to an oxygen barrier which, in turn, is attached to a gasket that engages the upper rim of the bottle so that the oxygen barrier layer is sandwiched between the first surface of the disk and the gasket in the initially sealed and packaged condition.

* * * * *

UNITED STATES PATENT AND TRADEMARK OFFICE
CERTIFICATE OF CORRECTION

PATENT NO. : 6,772,892 B2
DATED : August 10, 2004
INVENTOR(S) : Hal Stephen Flesher It is certified that error appears in the above-identified patent and that said Letters Patent is hereby corrected as shown below:

Column 8,
Line 18, after "condition," please delete "the Plug" and insert -- the plug -- in its place.

Signed and Sealed this

Twenty-ninth Day of March, 2005

JON W. DUDAS
*Director of the United States Patent and Trademark Office*